(12) United States Patent
Kraus et al.

(10) Patent No.: US 11,955,103 B2
(45) Date of Patent: Apr. 9, 2024

(54) SOUND-GENERATING REED FOR A WIND INSTRUMENT

(71) Applicant: neo-plastic Dr. Doetsch Diespeck GmbH, Diespeck (DE)

(72) Inventors: Wolfgang Kraus, Langenfeld (DE); Hubertus Freiherr von und zu Franckenstein, Weisendorf (DE)

(73) Assignee: neo-plastic Dr. Roetsch Dierspeck GmbH, Diespeck (DE)

( * ) Notice: Subject to any disclaimer, the term of this patent is extended or adjusted under 35 U.S.C. 154(b) by 178 days.

(21) Appl. No.: 17/533,524

(22) Filed: Nov. 23, 2021

(65) Prior Publication Data

US 2022/0165238 A1    May 26, 2022

(30) Foreign Application Priority Data

Nov. 24, 2020  (DE) ..................... 10 2020 007 172.4

(51) Int. Cl.
*G10D 9/035*    (2020.01)
*C08L 101/12*   (2006.01)

(52) U.S. Cl.
CPC ............ *G10D 9/035* (2020.02); *C08L 101/12* (2013.01); *C08L 2203/30* (2013.01); *C08L 2205/12* (2013.01)

(58) Field of Classification Search
CPC ........ G10D 9/035; G10D 7/06; C08L 101/12; C08L 2203/30; C08L 2205/12; C09K 19/38
See application file for complete search history.

(56) References Cited

U.S. PATENT DOCUMENTS

| | | | |
|---|---|---|---|
| 2,919,617 | A | 1/1960 | Brilhart |
| 3,759,132 | A | 9/1973 | Backus |
| 4,337,683 | A | 7/1982 | Backus |
| 4,355,560 | A | 10/1982 | Shaffer |
| 7,902,443 | B2 | 3/2011 | Legere et al. |
| 10,290,290 | B2 * | 5/2019 | Van Doren ............. B29C 70/52 |
| 2018/0322851 | A1 * | 11/2018 | Abe ........................ G10D 7/08 |

FOREIGN PATENT DOCUMENTS

| | | |
|---|---|---|
| CA | 2261473 A1 | 8/2000 |
| DE | 1615125 U | 10/1950 |
| DE | 8904968 U1 | 10/1989 |
| JP | 2008197450 A | 8/2008 |
| JP | 2017134156 A | 8/2017 |
| WO | 2019052702 A1 | 3/2019 |
| WO | 2019079837 A1 | 5/2019 |

* cited by examiner

*Primary Examiner* — Kimberly R Lockett
(74) *Attorney, Agent, or Firm* — Dinsmore & Shohl LLP

(57) ABSTRACT

The present specification relates to a sound-generating reed for a wind instrument which contains at least one thermotropic liquid crystalline polymer.

10 Claims, 3 Drawing Sheets

SOUND-GENERATING REED FOR A WIND INSTRUMENT

CROSS-REFERENCE TO RELATED APPLICATIONS

The present specification claims the benefit of German Application No. 10 2020 007 172.4 filed Nov. 24, 2020 and entitled "Sound-generating reed for a wind instrument," the entirety of which is incorporated by reference herein.

FIELD

The present specification relates to a sound-generating reed for a wind instrument which contains at least one thermotropic liquid crystalline polymer. The wind instrument is for example a clarinet, a saxophone, an oboe, or the like.

TECHNICAL BACKGROUND

A reed of the type mentioned at the outset is known from DE 89 04 968 U. This relates, however, to providing a reed for wind instruments, wherein the plastics material provides a reinforcement. According to an embodiment given in table form, at the front edge of the tongue thereof said reed has a wall thickness which is 0.24 mm in the center of the edge, and which is 0.18 mm at one side edge and 0.19 mm at an opposing side edge. The tongue is thus designed, overall, having a convexly curved upper face. A sound that is pleasant, soft, powerful, full, and always constant, as is desired, cannot be achieved with a reed designed in this way.

DE 1 615 125 U describes a reed for wind instruments consisting of a thermoplastic material.

U.S. Pat. No. 2,919,617 A discloses a reed for wind instruments which comprises layers of textile material stacked on top of one another, wherein the weft threads of the textile material are close together than the warp threads. A matrix of plastics material uniformly interconnects the threads of the textile material.

A reed for wind instruments is known from U.S. Pat. No. 3,759,132 A, wherein longitudinal ribs are embedded in the reed, which ribs extend from the end of the shaft of the reed to the front tongue edge thereof. A reed for wind instruments which is similar in principle is known from U.S. Pat. No. 4,337,683 A.

U.S. Pat. No. 4,355,560 A describes a reed for wind instruments which is produced from a plurality of fibers which are combined with a biner and a filler material. The filler material has a lower density than the binder, in order to achieve acoustic properties which are comparable with the acoustic properties of a reed made of natural reed material.

CA 2 261 473 A discloses a reed for wind instruments consisting of a uniaxially or biaxially oriented polypropylene plastics material. The reed can be produced by machining of a blank made of the plastics material. The blank is cut or stamped out of a sheet of a suitable wall thickness.

JP 2008-197450 A describes a reed for wind instruments which is produced in an injection molding method. In this case, a synthetic resin composition is used, which contains cellulose fibers.

U.S. Pat. No. 7,902,443 B2 discloses a reed for wind instruments made of an oriented plastics material, which can be a partially crystalline thermoplastic material such as uniaxially oriented polypropylene. The reed can be produced by machine, from a blank of the plastics material. The blank has a higher longitudinal modulus than known reed material of the same playing intensity.

JP 2017-134156 A describes a reed for wind instruments which comprises a synthetic resin matrix which contains a moist material, at least in part. The moist material can be formed from a moist layer which is laminated at least onto a portion of the surface of the reed. The moist material can for example be a powdery filler such as hydroxyapatite, diatomaceous earth, or lactic casein.

A reed consisting of a fiber composite material for wind instruments is known from WO 2019/052702 A1. The fiber composite material is a fiber-reinforced polymer compound into which small hollow microspheres are mixed. The polymer compound comprises a thermoplastic elastomer which is processed in an injection molding methods, such that a good batch consistency is achieved in the production of the reeds.

WO 2019/079837 A1 discloses a reed for wind instruments which comprises a polyamide from the group PA a, PA b, c or PA d-T or a mixture thereof, wherein a≥10, b≥6, c≥10 and d≥9.

SUMMARY

The object of the embodiments described herein is that of providing a sound-generating reed of the type mentioned at the outset, which can be manufactured in a simple and reproducible manner and has at least the sound characteristics of a reed made of reed material, wherein the sound quality is maintained unchanged, even after a long period of use, and the sound quality is virtually independent of the moisture content of the reed.

This object is achieved by the features of claim 1, i.e. in that the rod-like molecule chains of the at least one thermotropic liquid crystalline polymer of the reed are oriented in the longitudinal direction, from the shaft of the reed to the cutting edge-like front edge of the tongue, and in that the tongue has a wall thickness of ≤0.15 mm at the front edge thereof.

The reed according to the embodiments described herein can be produced in an injection molding method or in an injection compression method. This can be a single-component or multi-component method.

It may be expedient for the at least one thermotropic liquid crystalline polymer to contain fillers or reinforcing additives. These may be for example talc, sawdust, wood particles, glass and/or carbon fibers, and/or glass balls, mineral fillers, graphite, or the like.

According to embodiments, the at least one thermotropic liquid crystalline polymer can be mixed with at least one thermoplastic polymer. Said polymer can also contain fillers or reinforcing additives.

It has been found to be particularly advantageous if, in the case of the reed according to embodiments described herein, proceeding from the cutting edge-like front edge, the tongue comprises a wedge-shaped portion having a planar upper face which has a small acute angle in the direction towards the shaft, and a constant wall thickness over the width of the reed. The reed designed in this way has excellent tonal quality characteristics. In this case, the wedge-shaped portion of the tongue can for example have a surface area of from ≥5% to ≤20% of the overall basic surface area of the reed. The wedge-shaped portion of the tongue can have a surface area of from ≥6% to ≤40% of the overall surface area of the tongue.

According to embodiments, the contour lines of the wedge-shaped portion of the tongue extend in a straight line, in the width direction of the reed. Another possibility consists in the contour lines of the wedge-shaped surface portion of the tongue extending, in the width direction of the reed, in a manner at least approximately fitted to the cutting edge-like front edge of the tongue.

Advantages of the sound-generating reed according to embodiments described herein consist in the fact that the moisture uptake is negligibly small; it can—based on ISO 62—be less than 0.004%, in that the playing characteristics thereof are maintained in a temporally invariable manner, in that it can be adjusted without problem to the mouthpiece of the relevant wind instrument, in a suitably dimensioned manner, such that it is optimally usable not only by professional musicians for their wind instruments, but also for beginners, and in that it can even be boiled out if required, and consequently meets the requirements of the hygiene conditions without problem.

Further details, features and advantages can be found in the following description of an embodiment of the sound-generating reed for a wind instrument according to the embodiment that is shown in the drawings.

DETAILED DESCRIPTION

The figures illustrate an embodiment of the sound-generating reed 10 for a wind instrument. The reed 10 contains at least one thermotropic liquid crystalline polymer, the rod-like molecule chains of which are oriented in the longitudinal direction, from the shaft 12 of the reed 10 to the cutting edge-like front edge 14 of the tongue 16 of the reed 10. The tongue 16 has a wall thickness of ≤0.15 mm at the cutting edge-like front edge 14 thereof.

Figure 1:
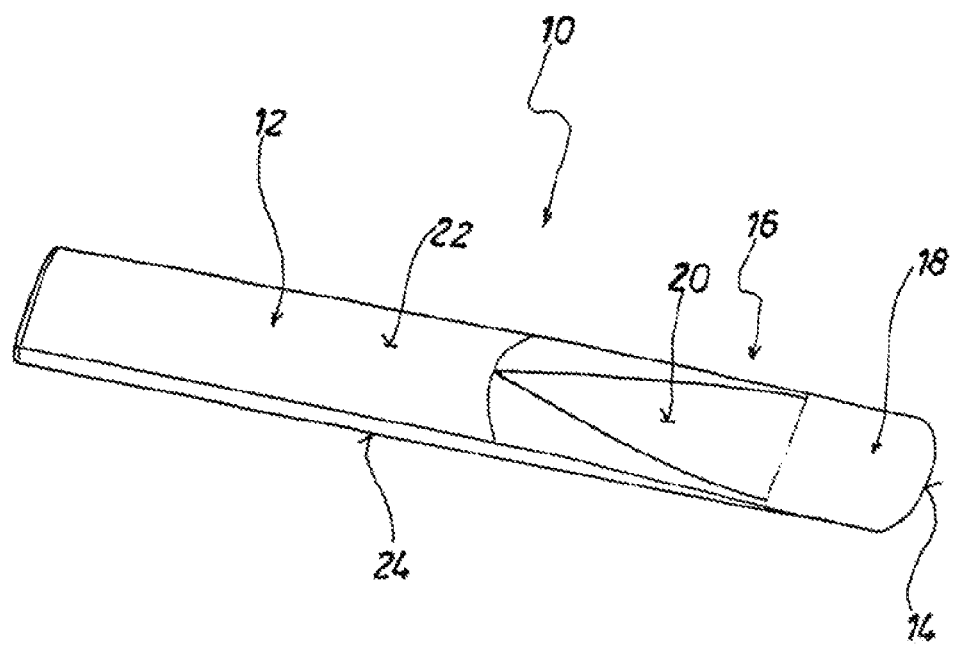
FIG. 1 is an enlarged perspective view of an embodiment of the sound-generating reed.
Figures 2, 3:
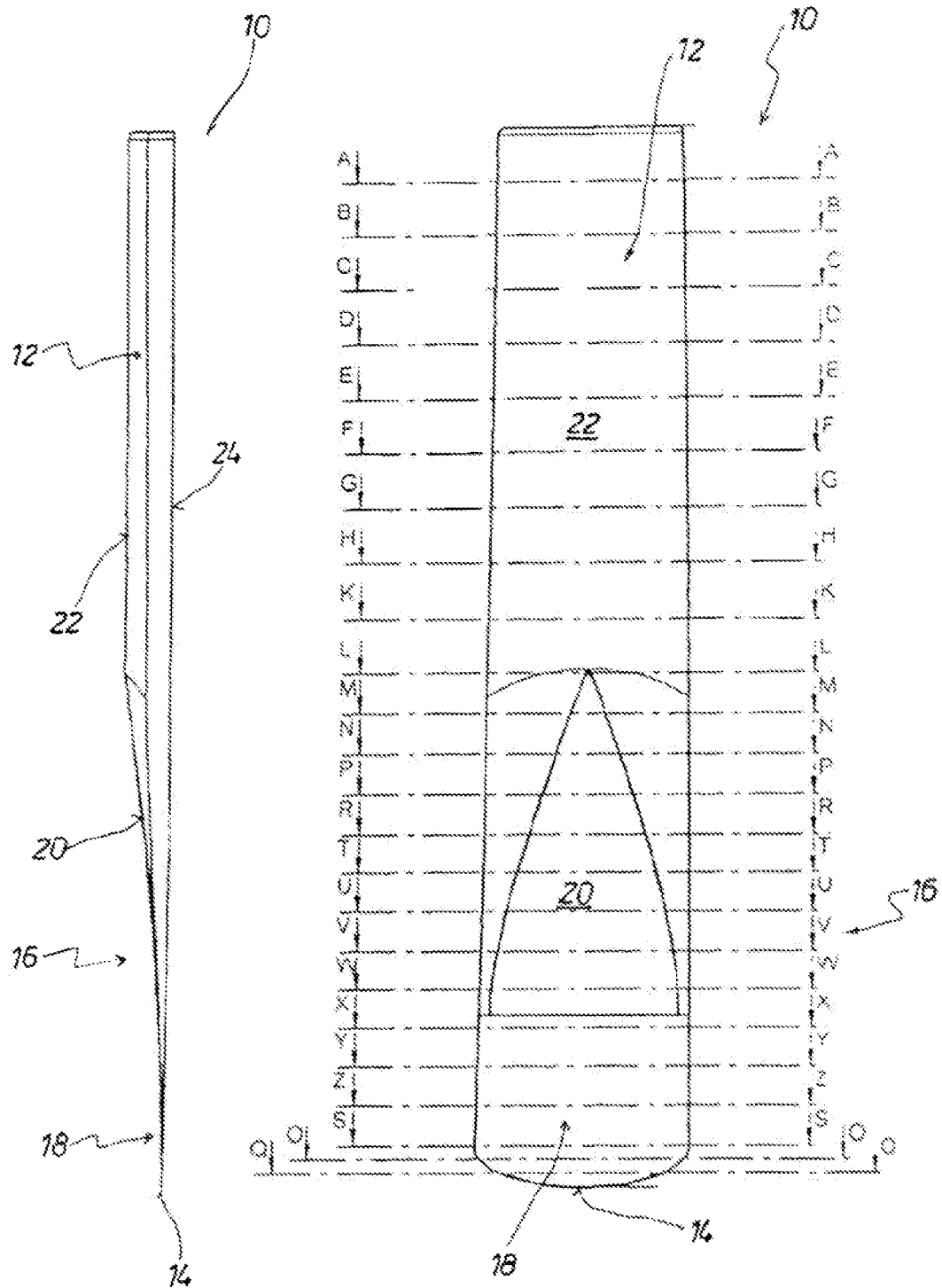
FIG. 2 is a more enlarged plan view of the reed according to FIG. 1, having cutting lines A-A and Q-Q through the reed.
FIG. 3 is a side view of the reed according to FIG. 2.
Figure 4:
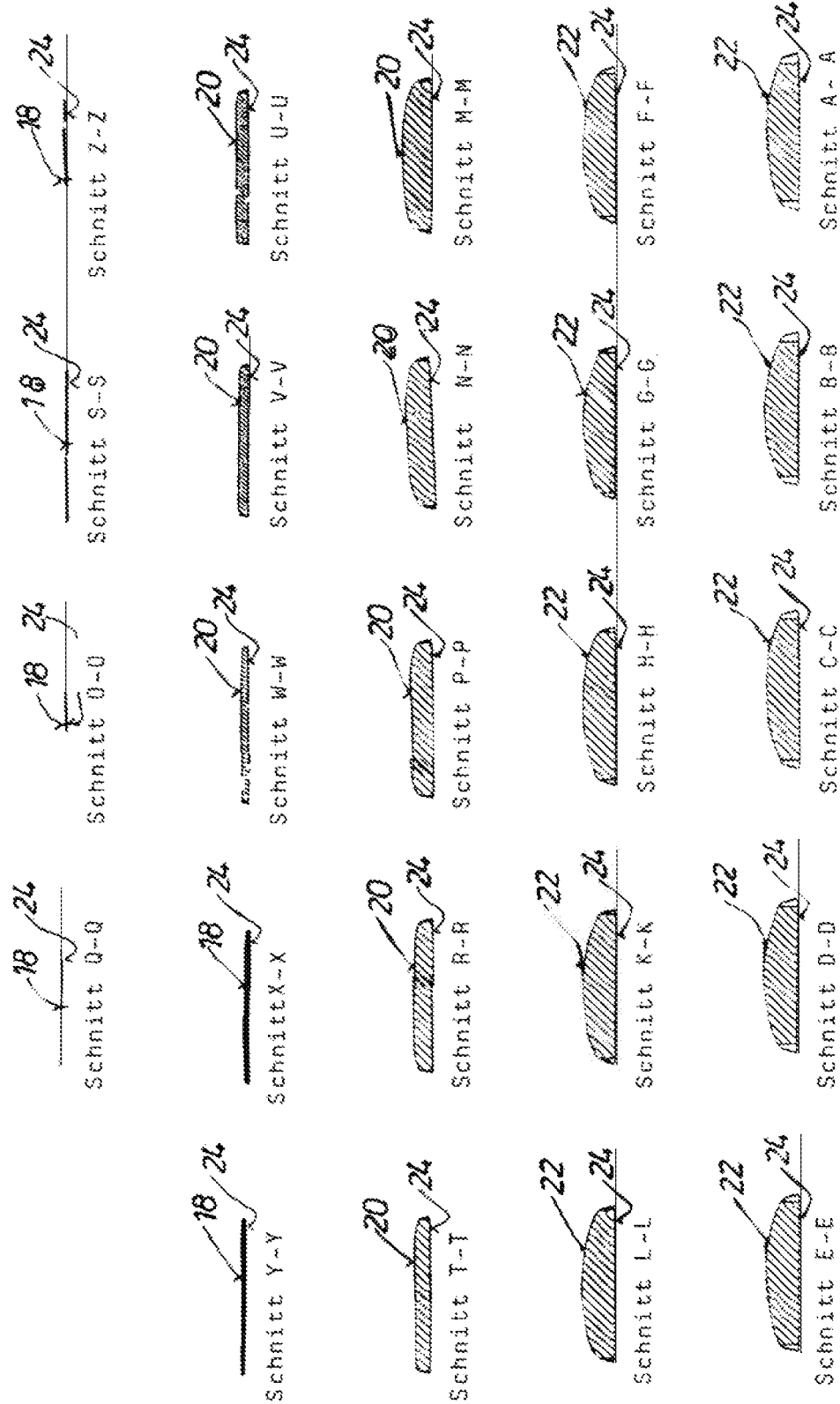
FIG. 4 shows the cross-sectional views through the reed according to the cutting lines A-A to Q-Q according to FIG. 2.

As is clear in particular from FIG. 3, proceeding from the cutting edge-like front edge 14 thereof, the tongue 16 comprises a wedge-shaped surface portion 18 which has a small acute angle in the direction towards the shaft 12 and which has a constant wall thickness over the width of the reed 10 or the tongue 16 thereof, as the cross sectional views X-X to Q-Q according to FIG. 4 illustrate.

The cutting lines of the cross sections X-X to Q-Q extend, as contour lines of the wedge-shaped surface portion 18 of the tongue 16, in a straight line in the width direction of the surface portion 18. Another possibility consists in the contour lines of the wedge-shaped surface portion 18 of the tongue 16 extending, in the width direction of the surface portion 18, in a manner at least approximately fitted to the cutting edge-like front edge 14 of the tongue 16.

Between the rear shaft 12 of the reed 10 and the front wedge-shaped surface portion 18 thereof, the tongue 16 is designed so as to be concavely curved having a flat portion 20 which narrows towards the shaft 12, as the cross sections M-M to W-W in FIG. 4 also illustrate.

The wedge-shaped portion 18 of the tongue 16 of the reed 10 has a surface area of from ≥5% to ≤20% in relation to the overall basic surface area of the reed 10 in the case of reeds 10 having a shaft 12 of normal length. In the case of reeds 10 having a relatively short shaft 12, the ratio of the wedge-shaped portion 18 to the overall tongue surface area is ≥6% to ≤40%.

The shaft 12 is formed, in a manner known per se, having a spherically convex upper face 22. The lower face 24 of the reed 10 is formed so as to be planar, in a manner known per se.

The invention claimed is:

1. A sound-generating reed for a wind instrument which contains at least one thermotropic liquid crystalline polymer, wherein:
    rod-like molecule chains of the at least one thermotropic liquid crystalline polymer of the reed (10) are oriented in a longitudinal direction, from a shaft (12) of the reed to a cutting edge-like front edge (14) of a tongue (16), and in that the tongue (16) has a wall thickness of ≤0.15 mm at the cutting edge-like front edge (14) thereof; and
    proceeding from the cutting edge-like front edge (14), the tongue (16) comprises a wedge-shaped portion (18) having a planar upper face which has a small acute angle in a direction towards the shaft (12), and a constant wall thickness over a width of the reed (10).

2. The sound-generating reed according to claim 1, wherein the reed (10) is produced in an injection molding method or in an injection compression method.

3. The sound-generating reed according to claim 1, wherein the at least one thermotropic liquid crystalline polymer contains fillers or reinforcing additives.

4. The sound-generating reed according to claim 1, wherein the at least one thermotropic liquid crystalline polymer is mixed with at least one thermoplastic polymer.

5. The sound-generating reed according to claim 4, wherein the at least one thermoplastic polymer contains fillers or reinforcing additives.

6. The sound-generating reed according to claim 1, wherein contour lines of the wedge-shaped portion (18) of the tongue (16) extend in a straight line in a width direction of the reed (10).

7. The sound-generating reed according to claim 1, wherein contour lines of the wedge-shaped portion (18) of the tongue (16) extend, in a width direction of the reed (10), in a manner at least approximately fitted to the cutting edge-like front edge (14) of the tongue (16).

8. The sound-generating reed according to claim 1, wherein the wedge-shaped portion (18) of the tongue (16) has a surface area of from ≥5% to ≤20% of an overall basic surface area of the reed (10).

9. The sound-generating reed according to claim 1, wherein the wedge-shaped portion (18) of the tongue (16) has a surface area of from ≥6% to ≤40% of an overall surface area of the tongue.

10. Use of a reed according to claim 1 for a clarinet, an oboe, or a saxophone.

* * * * *